Dec. 20, 1960  H. B. VAN RADEN  2,965,199
BRAKE SPIDER
Filed Feb. 3, 1958

INVENTOR.
HARVEY B. VAN RADEN
BY
BUCKHORN, CHEATHAM & BLORE

ATTORNEYS

Dec. 20, 1960 H. B. VAN RADEN 2,965,199
BRAKE SPIDER
Filed Feb. 3, 1958 2 Sheets-Sheet 2
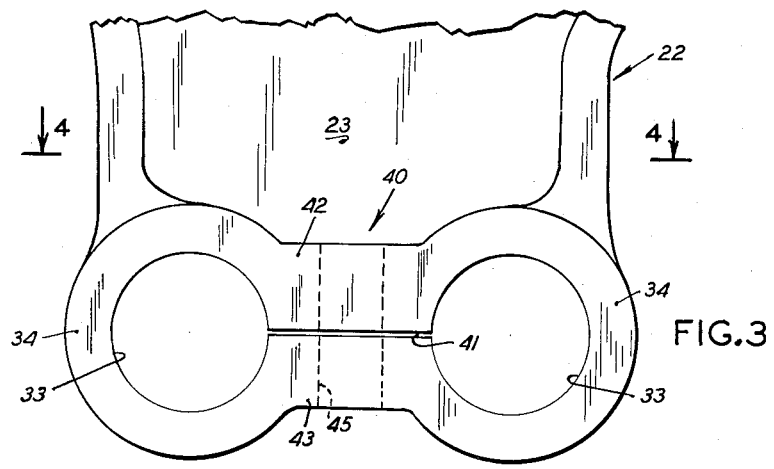
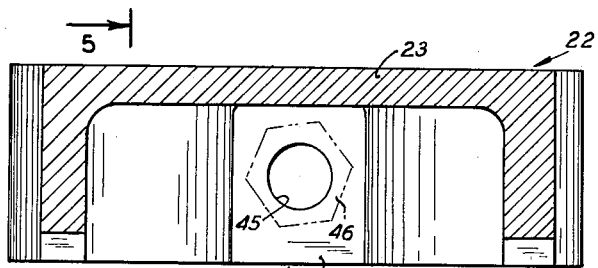
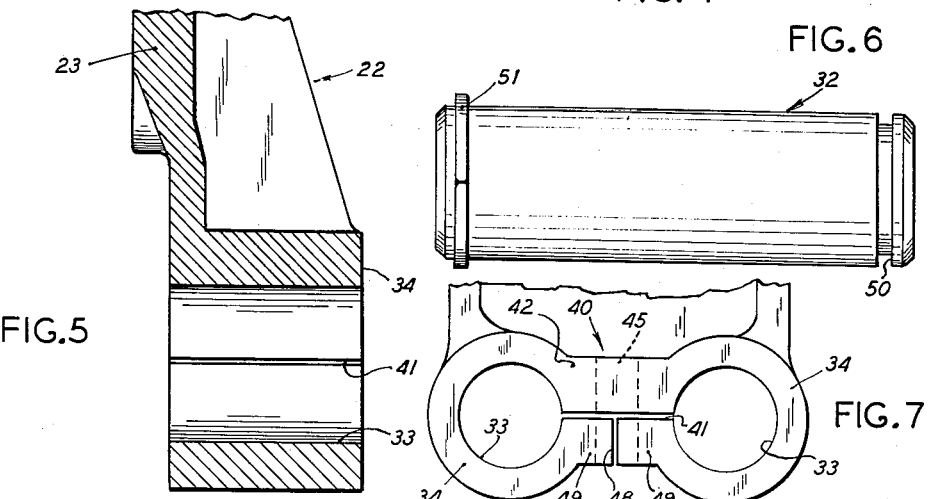
INVENTOR.
HARVEY B. VAN RADEN
BY
BUCKHORN, CHEATHAM & BLORE
ATTORNEYS United States Patent Office 2,965,199
Patented Dec. 20, 1960

2,965,199

BRAKE SPIDER

Harvey B. Van Raden, 549 NE. 3rd Ave., Portland 14, Oreg.

Filed Feb. 3, 1958, Ser. No. 712,877

6 Claims. (Cl. 188—78)

My present invention comprises an improvement in brake assemblies of the type employing arcuate, lined brake shoes which engage the inner periphery of a brake drum. The invention is of particular utility in heavy duty wheel brakes for trailers and trucks, but may be utilized in automobiles and other self-propelled vehicles, such as scoops, shovels, and the like, and in stationary equipment wherein a brake is employed to arrest a moving part.

The invention is limited in its application to a particular type of brake assembly wherein a brake drum is concentrically and rotatably disposed about a fixed member such as a trailer wheel mounting tube or the tubular housing of the axle of powered wheels for vehicles, or wherein a brake drum is fixedly mounted in concentric relation to a rotating shaft which drives a working tool or the like. In either case there is relative rotation between a brake shoe mounting member and a brake drum, the movable member of which may be arrested by forcing the brake shoe linings against the interior of the drum. The invention is limited to a brake shoe mounting spider having diametrically opposed portions, upon one of which the brake shoes are pivotally mounted, and the other of which mounts operating means to engage the brake by spreading the brake shoes apart and forcing the brake linings into contact with the inner surface of the drum.

There are a number of manufacturers of such brake assemblies, and by intention most of such manufacturers have made their parts interchangeable with parts of other manufacturers. However, when parts which must be so accurately located with respect to each other as the parts of a brake assembly must be, there are problems due to manufacturing limitations. For example, the spider is provided with a pair of anchor pin mounting openings which must be cylindrical, must have their axes parallel to each other and parallel to the axis of the drum and of the central spider mounting member, and which must be within certain tolerances as to bore diameter. For these reasons the fabrication of a brake shoe mounting spider involves the step of placing the spider in a multiple drill press wherein all openings therethrough are drilled at the same time. Then the openings for the anchor pins are reamed so as to provide smooth interiors and diameters within manufacturing tolerances. However, even when manufactured on the same machine, the diameters of the anchor pin mounting openings may vary widely, particularly since the reaming broach wears and becomes progressively reduced in diameter the longer it is used. It is easier to maintain the diameter of the anchor pins within close tolerances, for example, one and one-quarter inches plus or minus one thousandth of an inch, the standard diameter of the anchor pin mounting opening being one and one-quarter inches plus one to two thousandths of an inch. Therefore, if such tolerances were maintained, any mechanic could very easily replace a worn anchor pin with a new anchor pin. However, in practice this does not follow, and it is sometimes necessary to create an undersize anchor pin to be accommodated in an undersize anchor pin mounting, or to create an oversize anchor pin to be accommodated in an oversize anchor pin opening. An object of the present invention is to provide a brake shoe mounting spider which will accommodate itself to anchor pins having any reasonably close variation from standard diameter, either oversize or undersize.

A further object of the present invention, which is particularly useful in vehicles, especially trailers, is to provide means to prevent rapid deterioration of the parts of a brake assembly of this type, of the following nature. The brake shoes each comprises a clevis, the arms of which embrace the brake spider and are provided with openings for pivotally engaging the exposed ends of the anchor pin. All such devices within the prior art comprise means to retain the anchor pin on the spider, such as a set screw engaging a flat on the anchor pin, a pin engaging a peripheral anchor pin groove, or a key engaging a slot in the anchor pin. Since such retaining means prevent longitudinal movement of the anchor pin, it is natural for the person assembling the brake assembly, either in the first instance or following overhaul or replacement of brake linings, to select an undersize pin so that it may be easily slipped in and out of the anchor pin mounting opening. The brake shoes are quite heavy. As a result, when the vehicle is in motion, particularly if it is a lightly loaded trailer, the brake shoes are constantly hammering on the ends of the anchor pins and the anchor pins are constantly hammering against the walls of the mounting openings. As a result, the anchor pin mounting openings, rapidly in some instances, become hammered into oval shapes. As a consequence, the brake linings wear unevenly, which if allowed to progress too long may result in brake failure and accidents. Then, when the brake linings are replaced it may be necessary to rebore the anchor pin mounting openings and fabricate greatly oversize anchor pins in order to put everything back on a tightly fitting basis. The openings may be drilled off center. Or if the mechanic is not provided with the proper boring machinery, he may hammer an oversize pin into the opening, and this may result in the pin being off center. In either event, the heel or toe of the lining may engage without permitting engagement of the entire lining, with resulting brake failure, until the lining is worn unevenly. Under such circumstances the brakes may not apply sufficient braking force, or may grab, with equally dangerous but differing consequences. And in the event an oversize pin is hammered into position it may be impossible to remove it later, with the result that the entire spider and brake shoe assembly would have to be scrapped. An object of the present invention is to eliminate the dangers noted above by providing means in which it is impossible for the pin to play and commence hammering. A further object of the present invention is to provide a brake assembly which is less expensive, since set screws, keys, or anchor pins, openings in the spider to receive them, and corresponding grooves, flats or depressions in the anchor pin are eliminated. As a consequence of eliminating these positive fastening members the inspection of parts and reassembly is facilitated in that many times it is necessary to drill out the anchor pins or set screws and rebore, rethread or otherwise rework the spider in order to remount the anchor pins.

The foregoing objects and advantages may be more readily understood by reference to the following specification taken in connection with the accompanying drawings wherein the present invention is illustrated, and wherein a typical brake assembly is illustrated in association with a trailer wheel mounting tube.

In the drawings,

Fig. 3 is an elevation on an enlarged scale of the anchor pin mounting portion of the brake spider illustrated in Figs. 1 and 2;

Fig. 4 is a horizontal section taken substantially along line 4—4 of Fig. 3;

Fig. 5 is a vertical section taken substantially along line 5—5 of Fig. 4;

Fig. 6 illustrates an anchor pin of the present invention; and

Fig. 7 is a fragmentary view illustrating a modification of the invention.

Figure 1:
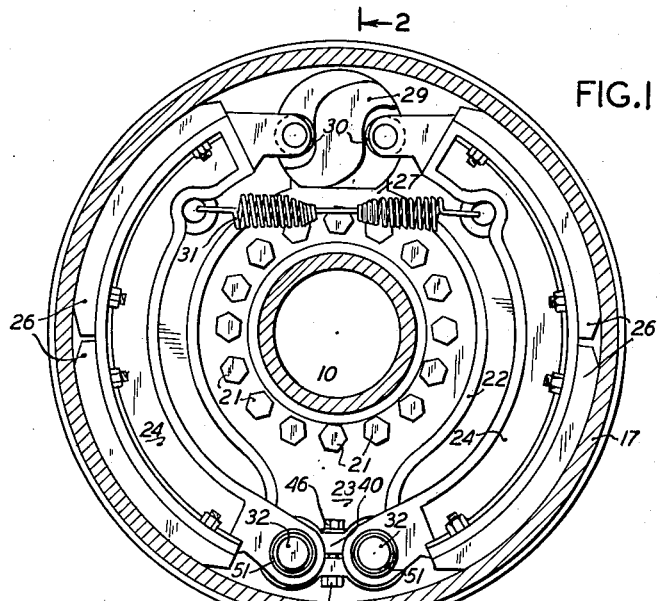
Fig. 1 is a vertical section taken substantially along line 1—1 of Fig. 2, the invention being shown in association with a typical trailer wheel assembly.
Figure 2:
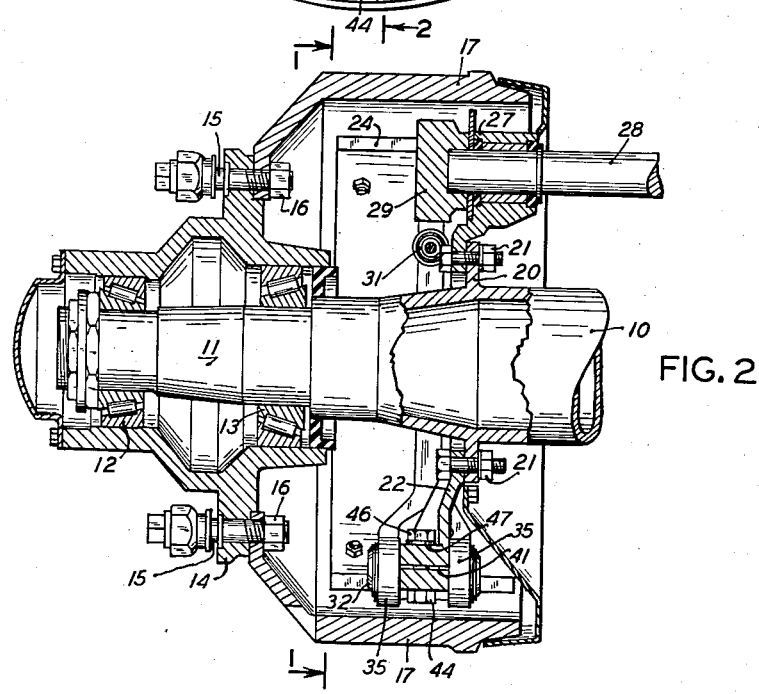
Fig. 2 is a vertical section taken substantially along line 2—2 of Fig. 1.

In the illustrated embodiment of the invention the brake drum assembly is mounted upon a trailer wheel mounting tube 10 comprising a spindle portion 11 upon which roller bearings 12 and 13 are mounted to support the wheel hub 14, the wheel hub being provided with the usual mounting bolts 15 for separably attaching a rim (not shown) thereto. Nuts 16 on the inner extremities of the mounting bolts 15 attach a brake drum 17 to the wheel hub in concentric relation to the tube 10. It is to be appreciated that other means may be provided for mounting a brake drum in concentric relation to a central member, with relative rotation between the member and the drum.

In the illustrated form the tube 10 is provided with an annular flange 20 in which are engaged a concentric array of threaded fastening members 21 which extends through the plate portion 19 of a brake shoe spider 22. The spider is provided with diametrically opposed portions extending toward the inner surface of the drum 17. In one of said portions, indicated at 23, means are provided for pivotally mounting a pair of oppositely disposed arcuate brake shoes 24 provided with brake linings 26 adapted to engage the inner surface of the drum 17. The other of said portions, indicated at 27, is provided with means for journaling a cam actuating shaft 28 to which is fixed a brake actuating cam 29. Cam follower rollers 30 are mounted upon the toe ends of the brake shoes so that simultaneous actuation of the brake shoes is effected upon partial rotation of the cam when the brakes are applied. A brake spring 31 is tensioned between the toes of the brake shoes so as to release the brake linings from engagement with the drum upon return of the cam 29 to its inactive position.

The heel ends of the brake shoes are pivotally mounted upon the portion 23 by brake shoe anchor pins 32 passing through anchor pin mounting openings 33 extending through the spider. The openings 33 are defined by concentric cylindrical flanges 34 which provide long journals for the anchor pins. The heel end of each brake shoe is in the form of a clevis with the arms 35 thereof embracing the spider and pivotally engaging the outwardly projecting ends of the anchor pin 32.

In accordance with the present invention the spider portion 23 is provided with a bridge 40 which is integral with each of the cylindrical flanges 34. A narrow slot 41 extends through the bridge, the slot being open in all directions and communicating with both of the anchor pin mounting openings 33. Preferably, the slot embraces a plane passing through the axes of the openings 33. It will thus be seen that the bridge comprises an upper portion or part 42 which, together with the adjacent portions of the flanges 34, is immobile with respect to the extremity 23. The bridge also comprises a lower portion or part 43 which connects the inner extremities of the lower portion of the flanges 34. The outer and lower half of each flange 34 is rendered flexible to a limited extent by the provision of the slot 41 thus permitting enlargement or constriction of the openings 33. Preferably, the upper surface of the portion 42 is flat and parallel to the slot 41, as is likewise the lower surface of the portion 43. Threaded fastening means span the slot 41, preferably the fastening means comprising a bolt 44 passing through a centrally disposed bore 45 at right angles to the slot, and a nut 46 engaging the threaded end of the bolt. A lock washer 47 is preferably disposed between the upper surface of the portion 42 and the nut 46 so that tightening of the bolt may be accomplished by a wrench engaged with its head.

In accordance with the present invention the anchor pin 32 is a cylindrical body throughout the portion thereof embraced within the bore 33 and embraced by the portions 35 of the brake shoe. The anchor pins are provided as usual with circumferential slots 50 at their ends for mounting snap rings 51 as a means to prevent longitudinal movement of the anchor pins prior to tightening the bolt 44. However, it is within the concept of the present invention that such split rings may be eliminated entirely, since the anchor pins are firmly retained by frictional engagement alone.

From the foregoing it may be seen that an oversize pin may be accommodated in either or both of the openings 33, the relative resiliency of the lower portions of the flanges and the connecting bridge portion permitting expansion of the openings to accommodate such pins, which would be driven into place. Likewise, an undersize pin may be accommodated in either or both of the openings 33, the slot 41 permitting constriction of the openings to frictionally engage the pins. In either case the pin will be positioned substantially on center, any deviation due to variation in pin size being unmeasurable by ordinary standards and well within allowable tolerances. Regardless of the relative dimensions of the pin and opening, tightening of the bolt 44 will firmly engage the surfaces of the openings 33 with the surfaces of the pins 32 frictionally to retain the pins in solidly seated engagement. There is thus no looseness to permit the initial play which develops into hammering the opening out of round. Thus, this cause of brake assembly failure is eliminated, by means which permits easy disassembly and reassembly by any mechanic using ordinary tools.

It is to be appreciated that the bridge portion 43 forms an integral, outwardly extending extension of the half of the flange 34 which lies along the periphery of the spider. It is the flexing of this unsupported lower and outer portion of the flange 34 which permits accommodation of the anchor pin opening to the various sizes of anchor pins which might be inserted therein. It is convenient, and the strongest construction possible, to have each of the extensions from each of the openings integral with each other as illustrated in Fig. 3, but the invention may assume the modification of having the extensions separate from each other, conveniently by providing a slot 48 through the middle of the portion 43 as illustrated in Fig. 7 so as to define opposite portions 49. A greater degree of flexibility is thus provided. The only difference is that in the modification of Fig. 3 the extensions are integral with each other to form the bridge portion 43, whereas in the modification of Fig. 7 the extension portions 49 are separate from each other and relatively movable with respect to each other.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. In a brake assembly of the type comprising a brake drum concentrically disposed about a member relatively movable with respect to said drum, a brake shoe spider surrounding said member and fixed thereto and having diametrically opposed portions adjacent the inner surface of said drum, a pair of opposed, arcuate brake shoes pivotally mounted within said drum, brake linings fixed to said shoes and adapted to engage the inner surface of said drum, a pair of brake shoe anchor pins pivotally mounting said brake shoes upon said spider, one of said portions having a pair of anchor pin mounting openings therethrough, said anchor pin mounting openings being closely adjacent each other, having their axes parallel to each other and having their axes parallel to the axis of said drum and mounting member, said openings being cylindrical and being defined by cylindrical flanges which form the periphery of the spider throughout about one-half of each of said anchor pin mounting openings, means mounted upon the other of said spider portions for applying braking force to said brake shoes, and means for disengaging the brake linings from the drum when released; the improvement comprising a flange extension extending respectively outwardly from and integral with one end of the periphery forming half of each one of said flanges, a narrow slot separating said extension from the remainder of the spider, said slot being open in all directions and communicating with the anchor pin mounting opening, threaded fastening means spanning said slot and operable to squeeze the sides of said slot toward each other whereby said slot may be contracted to constrict said anchor pin mounting openings frictionally to clamp undersized anchor pins therein, said slot permitting expansion of said anchor pin mounting opening to accommodate oversize anchor pins therein, and said anchor pins being retained in said anchor pin mounting openings solely by frictional engagement.

2. A construction as set forth in claim 1 wherein said extension is divided by a second slot extending substantially at right angles to the first mentioned slot so that said extension comprises separate portions movable relative to one another.

3. In a brake assembly of the type comprising a brake drum concentrically disposed about a member relatively movable with respect to said drum, a brake shoe spider surrounding said member and fixed thereto and having diametrically opposed portions adjacent the inner surface of said drum, a pair of opposed, arcuate brake shoes pivotally mounted within said drum, brake linings fixed to said shoes and adapted to engage the inner surface of said drum, a pair of brake shoe anchor pins pivotally mounting said brake shoes upon said spider, one of said spider portions having a pair of anchor pin mounting openings therethrough, said anchor pin mounting openings being closely adjacent each other, having their axes parallel to each other and having their axes parallel to the axis of said drum and mounting member, said openings being cylindrical and being defined by cylindrical flanges which form the periphery of the spider throughout about one half of each of said anchor pin mounting openings, means mounted upon the other of said spider portions for applying braking force to said brake shoes and means for disengaging the brake linings from the drum when released; the improvement comprising a bridge extending between and connecting said flanges, said bridge being integral with said flanges, said bridge and flanges having a narrow slot therethrough, open in all directions and communicating with both of said anchor pin mounting openings, said slot lying in a plane parallel to the axes of said anchor pin openings, threaded fastening means spanning said slot and operable to squeeze the sides of said slot toward each other whereby said slot may be contracted to constrict either or both of said anchor pin mounting openings frictionally to clamp undersized anchor pins therein, said slot permitting expansion of either or both of said anchor pin mounting openings to accommodate oversize anchor pins therein, and said anchor pins being retained in said anchor pin mounting openings solely by frictional engagement.

4. The construction set forth in claim 2 wherein said slot embraces a plane inclusive of the axes of said anchor pin mounting openings.

5. A brake shoe spider for an automotive vehicle, said spider comprising a plate portion for attachment to a wheel assembly and an integral brake shoe supporting portion for pivotally supporting a pair of brake shoes, said brake shoe supporting portion comprising a pair of spaced flanges each having a cylindrical brake shoe mounting pin opening extending therethrough, said openings being axially parallel, a bridge extending between and connecting said flanges, said bridge and flanges having a slot therethrough, open in all directions and communicating with both of said pin mounting openings, said slot permitting relative movement of the parts of said bridge on the opposite sides of said slot toward and away from each other thereby to constrict, or enlarge, respectively, either or both of said anchor pin openings, and means operatively arranged with said bridge parts and operable to move said bridge parts together to constrict said openings so as to clamp anchor pins disposed in said openings.

6. A brake shoe spider for an automotive vehicle, said spider comprising a plate portion for attachment to a wheel assembly and an integral brake shoe supporting portion for pivotally supporting a pair of brake shoes, said brake shoe supporting portion comprising a pair of cylindrical flanges each having a cylindrical brake shoe mounting pin opening extending therethrough, said openings being axially parallel, a bridge extending between and connecting said flanges, said bridge and flanges having a slot therethrough, open in all directions and communicating with both of said pin mounting openings, said slot permitting relative movement of the parts of said bridge on the opposite sides of said slot toward and away from each other thereby to constrict, or enlarge, respectively, either or both of said anchor pin openings, and releasable fastening means extending through said bridge parts and operable to move said parts together to constrict said openings so as to clamp anchor pins disposed in said openings.

References Cited in the file of this patent

UNITED STATES PATENTS

| | | |
|---|---|---|
| 1,295,505 | Howe | Feb. 25, 1919 |
| 1,372,166 | White | Mar. 22, 1921 |
| 1,423,901 | Baker | July 25, 1922 |
| 1,534,009 | Burgess | Apr. 14, 1925 |
| 1,760,323 | Shelton | May 27, 1930 |
| 2,167,607 | Alden | July 25, 1939 |

UNITED STATES PATENT OFFICE
CERTIFICATION OF CORRECTION

Patent No. 2,965,199                        December 20, 1960

Harvey B. Van Raden

It is hereby certified that error appears in the above numbered patent requiring correction and that the said Letters Patent should read as corrected below.

Column 6, line 10, for the claim reference numeral "2" read -- 3 --.

Signed and sealed this 16th day of May 1961.

(SEAL)
Attest:

ERNEST W. SWIDER                      DAVID L. LADD

Attesting Officer                       Commissioner of Patents